(12) United States Patent
Xu et al.

(10) Patent No.: US 12,273,897 B2
(45) Date of Patent: *Apr. 8, 2025

(54) RS AVAILABILITY INDICATION BY PAGING PDCCH AND PEI

(71) Applicant: QUALCOMM Incorporated, San Diego, CA (US)

(72) Inventors: Huilin Xu, Temecula, CA (US); Yan Zhou, San Diego, CA (US); Yuchul Kim, San Diego, CA (US); Yongjun Kwak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,111

(22) Filed: Dec. 20, 2023

(65) Prior Publication Data

US 2024/0155624 A1 May 9, 2024

Related U.S. Application Data

(63) Continuation of application No. 17/381,045, filed on Jul. 20, 2021, now Pat. No. 11,895,664.

(51) Int. Cl.
*H04W 72/23* (2023.01)
*H04W 68/02* (2009.01)

(52) U.S. Cl.
CPC ........... *H04W 72/23* (2023.01); *H04W 68/02* (2013.01)

(58) Field of Classification Search
CPC .... H04W 72/23; H04W 68/02; H04W 68/005
See application file for complete search history.

(56) References Cited

U.S. PATENT DOCUMENTS

| 2021/0288773 A1 | 9/2021 | Lin et al. |
| 2022/0046582 A1 | 2/2022 | Shrivastava et al. |

(Continued)

FOREIGN PATENT DOCUMENTS

| CN | 115208534 A | 10/2022 |
| CN | 116868656 A | 10/2023 |

OTHER PUBLICATIONS

Ericsson: "Provisioning of TRS Occasions to Idle/Inactive UEs", 3GPP TSG RAN WG1 #105-e, Tdoc R1-2105792, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 12, 2021, XP052011717, 12 Pages, paragraph 2.

(Continued)

*Primary Examiner* — Phirin Sam
*Assistant Examiner* — Tarell A Hampton
(74) *Attorney, Agent, or Firm* — Procopio, Cory, Hargreaves & Savitch LLP

(57) ABSTRACT

Methods, computer programs products, and apparatuses for RS availability indication are provided. An example method at a UE may include receiving, from a base station, a PEI comprising a first availability indication for a first set of RS resources in one or more RS occasions. The example method may further include receiving, from the base station, a paging PDCCH comprising a second availability indication for a second set of RS resources in the one or more RS occasions. The example method may further include receiving, from the base station, at least one of the first set of RS resources or the second set of RS resources.

32 Claims, 15 Drawing Sheets

(56) References Cited

U.S. PATENT DOCUMENTS

| | | |
|---|---|---|
| 2022/0271878 A1 | 8/2022 | Lin |
| 2022/0321296 A1 | 10/2022 | Ye et al. |
| 2022/0322281 A1 | 10/2022 | Liao et al. |
| 2022/0330201 A1* | 10/2022 | Hwang ................ H04W 72/23 |
| 2023/0032154 A1 | 2/2023 | Hwang et al. |
| 2023/0044109 A1 | 2/2023 | Xu et al. |
| 2023/0073100 A1 | 3/2023 | Maleki et al. |
| 2023/0076100 A1 | 3/2023 | Maleki et al. |
| 2023/0143590 A1 | 5/2023 | Li et al. |
| 2024/0147418 A1* | 5/2024 | Fu ..................... H04W 72/0453 |
| 2024/0243869 A1* | 7/2024 | Wang .................... H04L 5/0094 |
| 2024/0244701 A1* | 7/2024 | Li ......................... H04W 76/28 |

OTHER PUBLICATIONS

Huawei et al., "Assistance RS Occasions for Idle/Inactive Mode", 3GPP TSG RAN WG1 Meeting #104-e, R1-2100217, 3rd Generation Partnership Project, Mobile Competence Centre, 650, Route Des Lucioles, F-06921 Sophia-Antipolis Cedex, France, vol. RAN WG1, No. E-meeting, Jan. 25, 2021-Feb. 5, 2021 Jan. 19, 2021, XP051970849, 9 Pages, paragraph 2 figures 1 and 3.

International Search Report and Written Opinion—PCT/US2022/037323—ISA/EPO—Oct. 28, 2022.

Nokia et al., "On RS Information to Idle/Inactive Mode UEs", 3GPP TSG RAN WG1 #105-e, R1-2105506, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 11, 2021, XP052006393, 13 Pages, Paragraph 2 Paragraph 3.

NTT Docomo et al., "Discussion on TRS/CSI-RS Occasion for Idle/Inactive UEs", 3GPP TSG RAN WG1 #105-e, R1-2105709, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 12, 2021, XP052011660, 4 Pages, paragraph 2.1.

VIVO: "TRS/CSI-RS Occasion(s) for Idle/Inactive UEs", 3GPP TSG RAN WG1 #105-e, R1-2104372, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021 May 12, 2021, XP052010779, 5 Pages, paragraph 3.1.

TCL Communication: "TRS/CSI-RS occasions for Idle/inactive mode", R1-2104308, 3GPP TSG RAN WG1 Meeting #105-e, E-meeting, May 10-May 27, 2021, 8 Pages.

* cited by examiner

US 12,273,897 B2

RS AVAILABILITY INDICATION BY PAGING PDCCH AND PEI

CLAIM OF PRIORITY UNDER 35 U.S.C. § 119

This patent application is a continuation of U.S. Non-Provisional application Ser. No. 17/381,045 entitled "RS AVAILABILITY INDICATION BY PAGING PDCCH AND PEI" and filed on Jul. 20, 2021, which is assigned to the assignee hereof and hereby expressly incorporated by reference herein.

TECHNICAL FIELD

The present disclosure relates generally to communication systems, and more particularly, to wireless communication systems with paging early indication (PEI), physical downlink control channel (PDCCH), and reference signal (RS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a base station, a PEI including a first availability indication for a first set of RS resources in one or more RS occasions. The memory and the at least one processor coupled to the memory may be further configured to receive, from the base station, a paging PDCCH including a second availability indication for a second set of RS resources in the one or more RS occasions. The memory and the at least one processor coupled to the memory may be further configured to receive, from the base station, at least one of the first set of RS resources or the second set of RS resources.

In another aspect of the disclosure, a method, a computer-readable medium, and an apparatus at a base station are provided. The apparatus may include a memory and at least one processor coupled to the memory. The memory and the at least one processor coupled to the memory may be configured to transmit, to a UE, a PEI including a first availability indication for a first set of RS resources in one or more RS occasions. The memory and the at least one processor coupled to the memory may be further configured to transmit, to the UE, a paging PDCCH including a second availability indication for a second set of RS resources in the one or more RS occasions. The memory and the at least one processor coupled to the memory may be further configured to transmit, to the UE, at least one of the first set of RS resources or the second set of RS resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
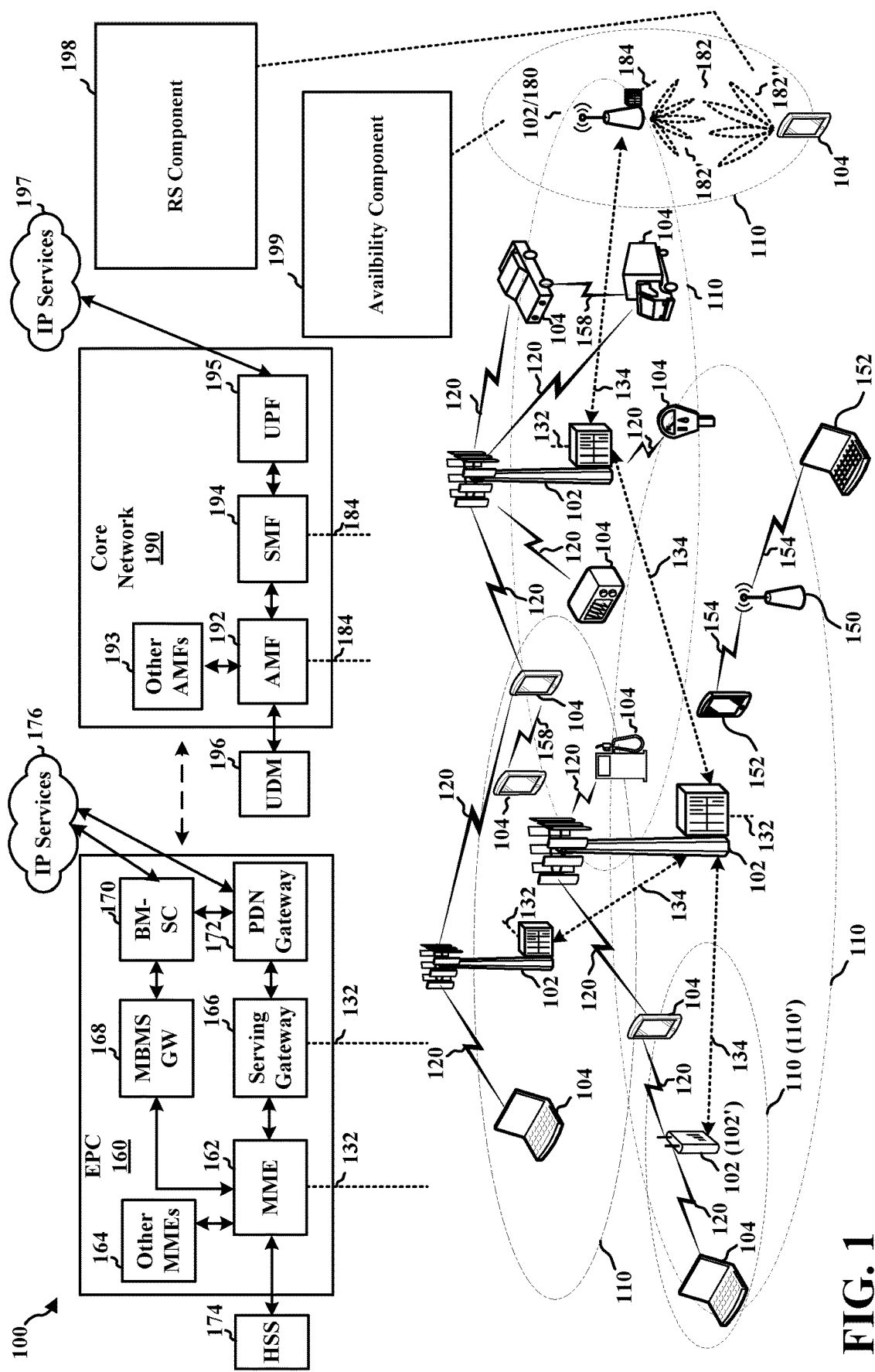
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a RS component 198. In some aspects, the RS component 198 may be configured to receive, from a base station, a PEI including a first availability indication for a first set of RS resources in one or more RS occasions. In some aspects, the RS component 198 may be further configured to receive, from the base station, a paging PDCCH including a second availability indication for a second set of RS resources in the one or more RS occasions. In some aspects, the RS component 198 may be further configured to receive, from the base station, at least one of the first set of RS resources or the second set of RS resources.

In certain aspects, the base station 180 may include an availability component 199. In some aspects, the availability component 199 may be configured to transmit, to a UE, a PEI including a first availability indication for a first set of RS resources in one or more RS occasions. In some aspects, the availability component 199 may be further configured to transmit, to the UE, a paging PDCCH including a second availability indication for a second set of RS resources in the one or more RS occasions. In some aspects, the availability component 199 may be further configured to transmit, to the UE, at least one of the first set of RS resources or the second set of RS resources.

Although the following description may be focused on 5G NR, the concepts described herein may be applicable to other similar areas, such as LTE, LTE-A, CDMA, GSM, and other wireless technologies.

Figure 2:
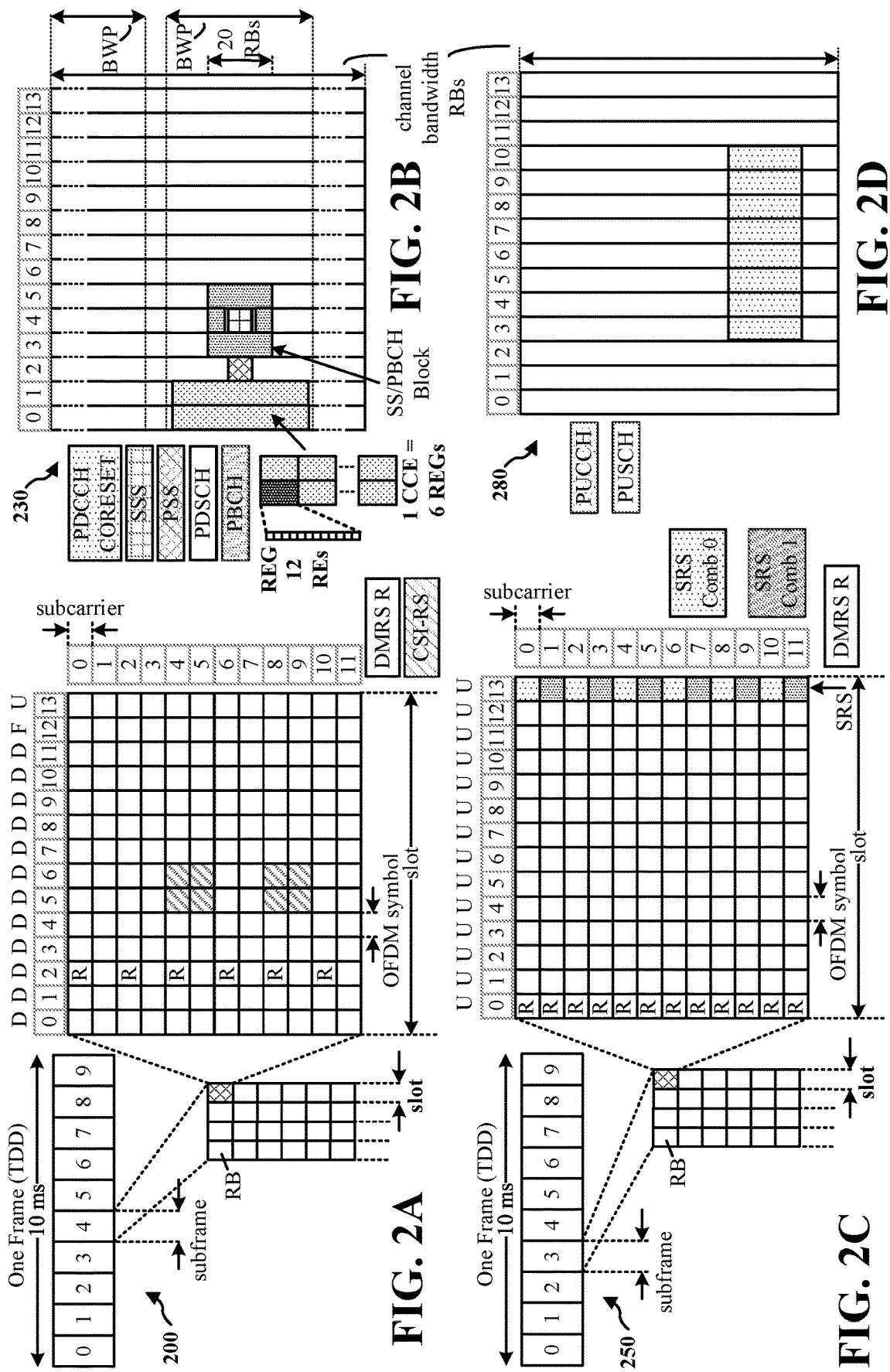
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
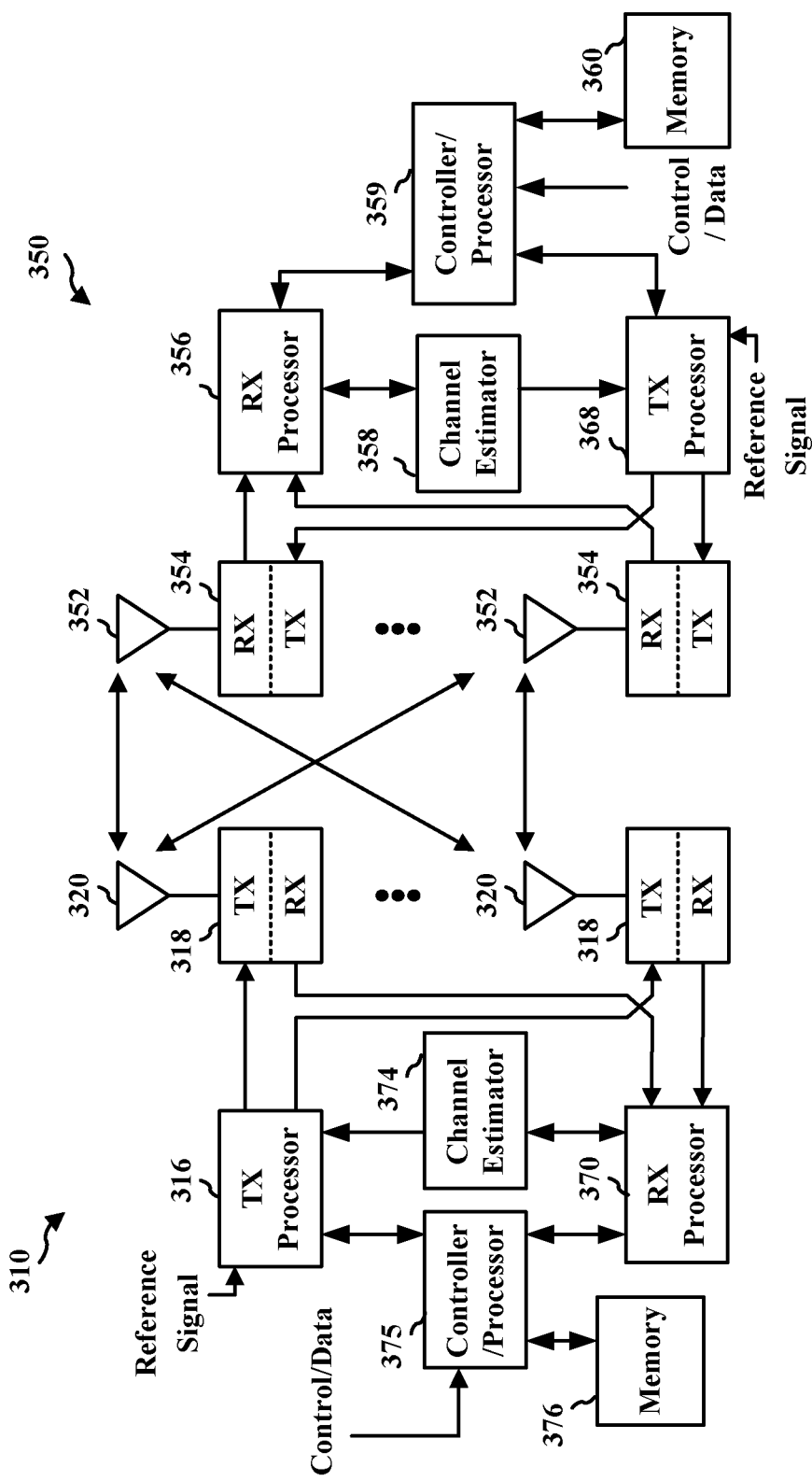
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the RS component 198 of FIG. 1.

At least one of the TX processor 316, the RX processor 370, and the controller/processor 375 may be configured to perform aspects in connection with the availability component 199 of FIG. 1.

A UE in a communication system may enter an idle state or an inactive state to preserve battery power if the UE does not have an ongoing data transmission. In the idle state, the UE may monitor for a paging message at a set of defined times. The UE is able to preserve power because the UE may turn off a receiver at the UE when the UE is not monitoring for the paging message. For example, DRX and other similar techniques may be employed by the UE to preserve battery power. When a network receives new data for the UE or determines to transmit new data to the UE for a variety of reasons such as PWS or other emergency, the network may transmit a paging message to probe the idle UE so that the UE may receive the new data. The base station may send the page for any of a number of reasons, e.g., to trigger a radio resource control set up with the UE, to provide a system information modification to the UE, or to provide a public warning system notification to the UE.

To save power, TRS or CSI-RS for idle/inactive mode UEs and PEI may be provided for a UE. A TRS may be sparse reference signals intended to assist the UE in time and frequency tracking. The idle/inactive mode UEs may be configured to receive the TRS for performing tracking loop updates, for example. A TRS may have been configured for one or more connected mode UEs and there may be no dedicated idle/inactive TRS. An idle/inactive UE may benefit from an increased density of RS opportunities for tracking loop updates including both SSB and TRS/CSI-RS, which may allow the idle/inactive UE to have a longer duration in a low power mode. For example, the UE may employ a longer deep sleep time between reception of the TRS. For example, if a TRS with a 20 millisecond (ms) periodicity is configured, the joint SSB/TRS periodicity may be 10 ms on average.

A PEI may be used by a base station to indicate whether any UE is paged in a paging occasion (PO). A PEI may be transmitted before a PO. A PEI may be sequence based (e.g., secondary synchronization signal or CSI-RS/TRS based) or PDCCH based. The PEI may indicate the UE whether to decode paging PDCCH/PDSCH in the PO. The PEI may also be used in connection with UE subgrouping (splitting UEs in the same PO into smaller groups). If subgroups of UEs are configured, the PEI may indicate whether any subgroup is paged (e.g., one of the UEs in a particular subgroup). If a subgroup of UEs is not configured, the PEI may indicate whether any UEs (e.g., among all UEs) in the PO is paged. The power consumption for receiving the PEI may be potentially lower than decoding a paging PDCCH. The PEI may also facilitate power saving because paging PDSCH decoding may be reduced. In addition, with PEI, UE may skip extra SSBs used by tracking loop accuracy for paging PDSCH decoding, in order to achieve further power savings at the UE.

In some wireless communication systems, SIB signaling may provide a configuration of TRS/CSI-RS occasion(s), and periodic TRS may be supported while non-periodic TRS may not be supported. Layer 1 (L1) signaling may be used to indicate whether the TRS is transmitted in a particular configured occasion by paging PDCCH, PEI, or SIB. Before a UE receives the indication, the UE may assume that TRS is not transmitted and blind detection may not be used. A TRS may be quasi-colocated (QCL'd) (e.g., have a same quasi-colocation) with a transmitted SSB. If a first signal transmitted via a first antenna port and a second signal transmitted via a second antenna port have common defined radio channel properties when being processed at a receiver, the two signals and the two antenna ports are QCL'ed. The common defined radio channel properties may be different depending on the specific QCL type. As an example, there may be multiple QCL types, such as QCL Type A which includes Doppler shift, Doppler spread, average delay, and delay spread; QCL Type B which includes Doppler shift and Doppler spread; QCL Type C which includes average delay and Doppler shift; and QCL Type D which includes spatial receiving parameters. In such wireless communication systems, SCS of TRS may be the same as SCS of a defined control resource set (CORESET), such as CORESET #0. A UE may not be expected to receive the TRS outside the initial DL BWP and radio resource measurement (RRM) measurement with the TRS for serving cell may be up to UE implementation.

Some aspects provided herein may provide support for a paging PDCCH based availability indication of RS (such as TRS, CSI-RS, or the like) occasions for idle/inactive UEs and support for a PEI based availability indication of RS (such as TRS, CSI-RS, or the like) occasions for idle/inactive UEs.

Figure 4:
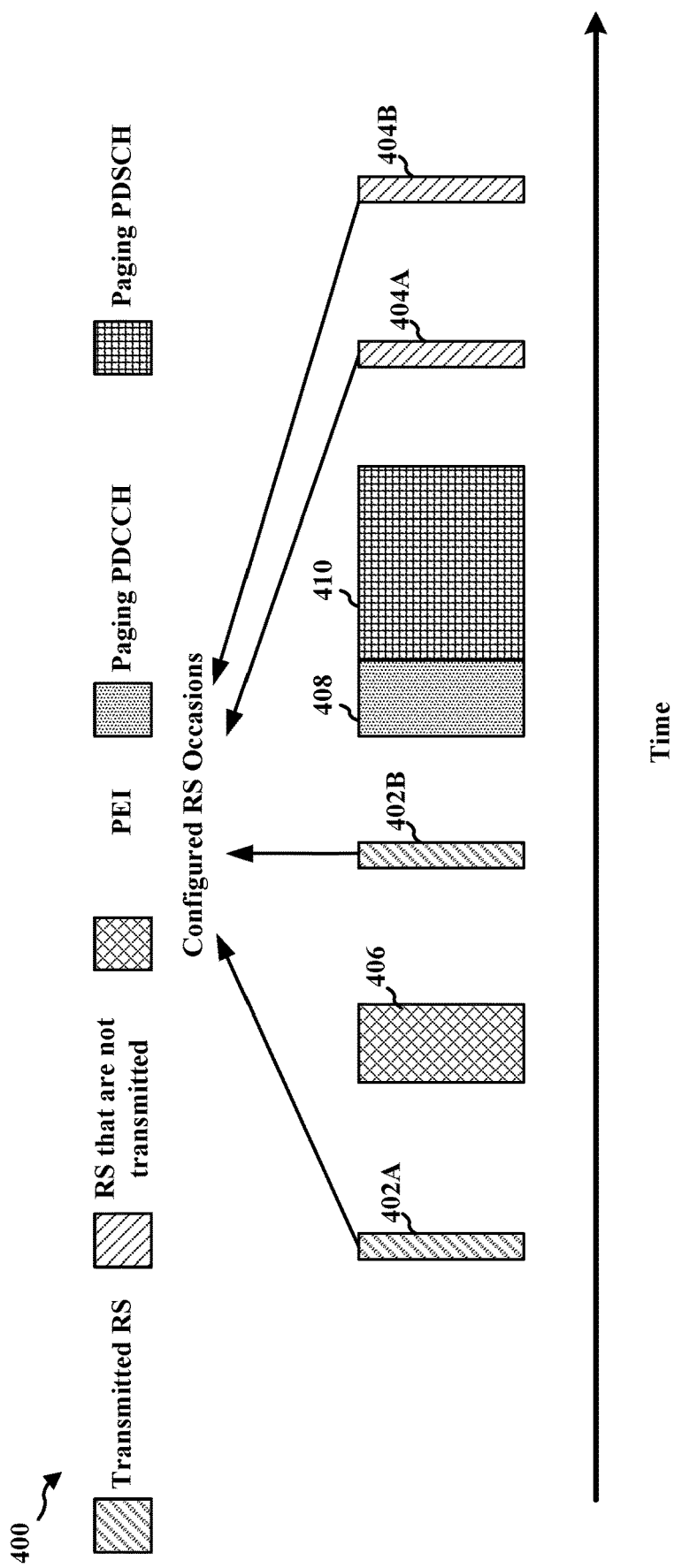
FIG. 4 is a diagram illustrating example RS availability indication, PEI and PDCCH.

FIG. 4 is a diagram 400 illustrating example RS availability indication, PEI and PDCCH. The RS illustrated in FIG. 4 may be CSI-RS, TRS, or the like. A network may configure (e.g., a base station in the network may transmit to a UE to configure) transmission occasions of N (e.g., N≥1) RS resources to the UE via SIB. PEI or paging PDCCH may indicate to the UE which RS (one or more) of the N RS resources are transmitted in their configured occasions. If an RS will be transmitted in an RS resource (e.g., would be transmitted), the RS resource may be referred to as "available" to the UE. For example, as illustrated in FIG. 4, the configured RS occasions may include RS 402A, RS 402B, RS 404A, and RS 404B. The RS 402A and RS 402B may be unavailable (e.g., the RS would not be transmitted) and the RS 404A and RS 404B may be available (e.g., the RS would be transmitted). PEI 406, paging PDCCH 408, and paging PDSCH 410 may also be transmitted to the UE.

The base station may transmit the availability indication based on different granularity levels. The term granularity may be used to refer to a level of detail of representing resources in an indication. For example, a first indication with a first granularity may include one or more bits each representing a RS resource (may be referred to as "per RS resource granularity"). In another example, a second indication with a second granularity may include one or more bits each representing a set of RS resources (may be referred to as "per RS resource set granularity"). In another example, a third indication associated with a third granularity may include one or more bits representing a group of RS resource sets (may be referred to as "per group of RS resource sets granularity"). In another example, a fourth indication associated with a fourth granularity may include one or more bits representing whether any RS resources are transmitted in an upcoming PO (may be referred to as "all configured RS resources granularity"). The SIB may provide configuration for the RS resource, RS resource set, group of RS resource sets, or the like. A RS resource, a RS resource set, or a group of RS resource sets may be referred to as a "resource unit".

In some aspects, an availability indication may be based on a bitmap where each bit indicates availability for each resource unit. In some aspects, an availability indication may be based on a codepoint indicating availability for a resource unit. In some aspects, paging PDCCH may be used to carry an indication of idle/inactive mode TRS so that support of PEI and idle/inactive RS features may be decoupled (e.g., independently support PEI and idle/inactive RS features may be possible).

Figure 5:
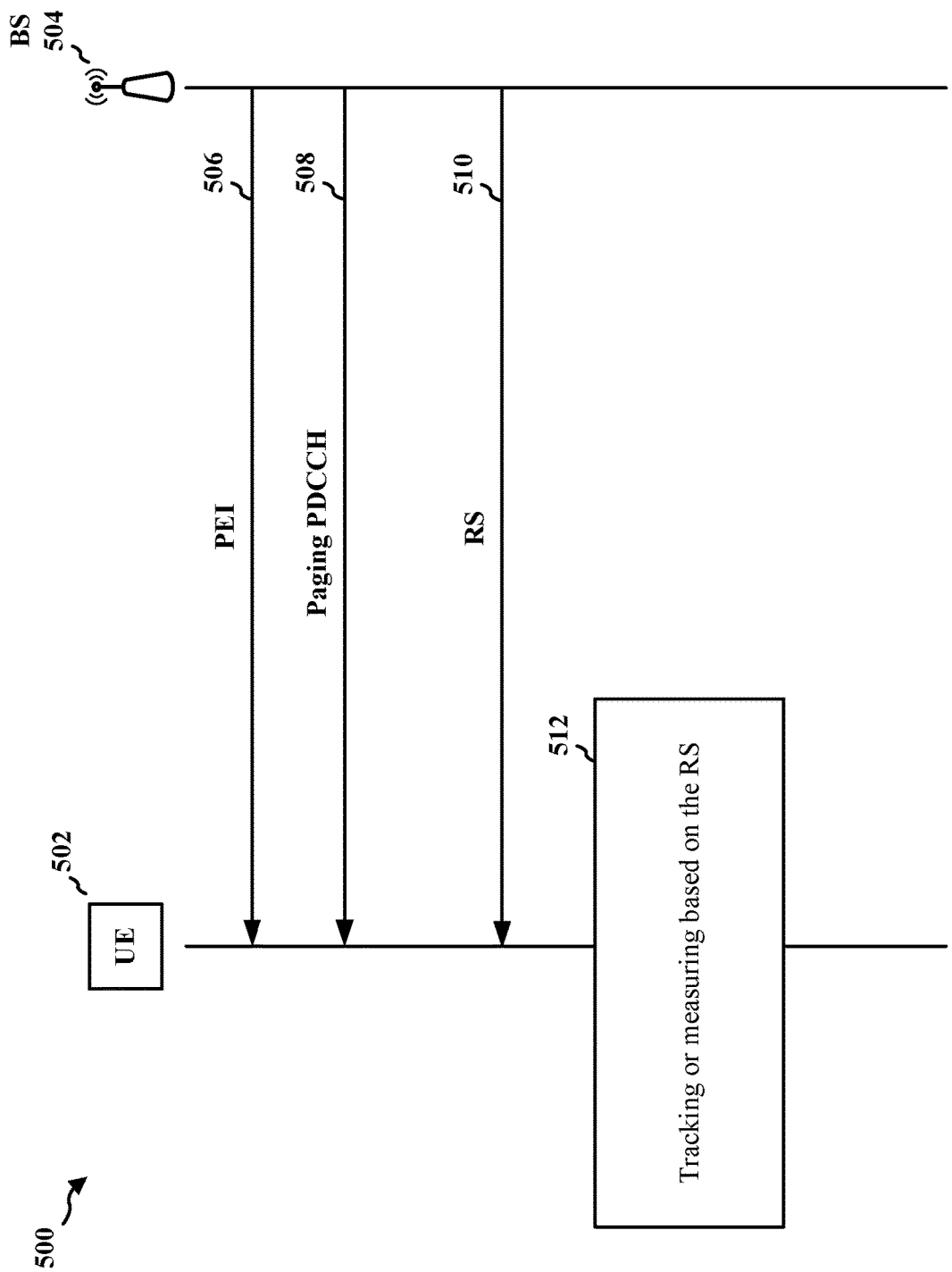
FIG. 5 is a diagram illustrating an example communication flow between UEs and a base station.

FIG. 5 is a diagram illustrating an example communication flow 500 between a UE 502 and a base station 504. As illustrated in FIG. 5, the base station 504 may transmit a PEI 506 to a UE 502. After transmitting the PEI 506, the base station may transmit a paging PDCCH 508 to the UE 502 and RS 510 which may include one or more RS may be transmitted. The PEI 506 may correspond with the PEI 406 in FIG. 4, the PEI 606 in FIG. 6, the PEI 706 in FIG. 7, the PEI 806 in FIG. 8, the PEI 906 in FIG. 9, or the PEI 1006 in FIG. 1006. The paging PDCCH 508 may correspond with the paging PDCCH 408 in FIG. 4, the paging PDCCH 608 in FIG. 6, the paging PDCCH 708 in FIG. 7, the paging PDCCH 808 in FIG. 8, the paging PDCCH 908 in FIG. 9, or the paging PDCCH 1008 in FIG. 1008. The RS 510 may correspond with any RS in FIG. 4 and FIGS. 5-10. In some aspects, both the PEI 506 and the paging PDCCH 508 carry availability indication for RS resources (e.g., RS 510) in configured RS occasions. At 512, the UE 502 may track, such as perform time or frequency tracking, based on a TRS in RS 510 or measure based on a CSI-RS in RS 510.

Figure 6:
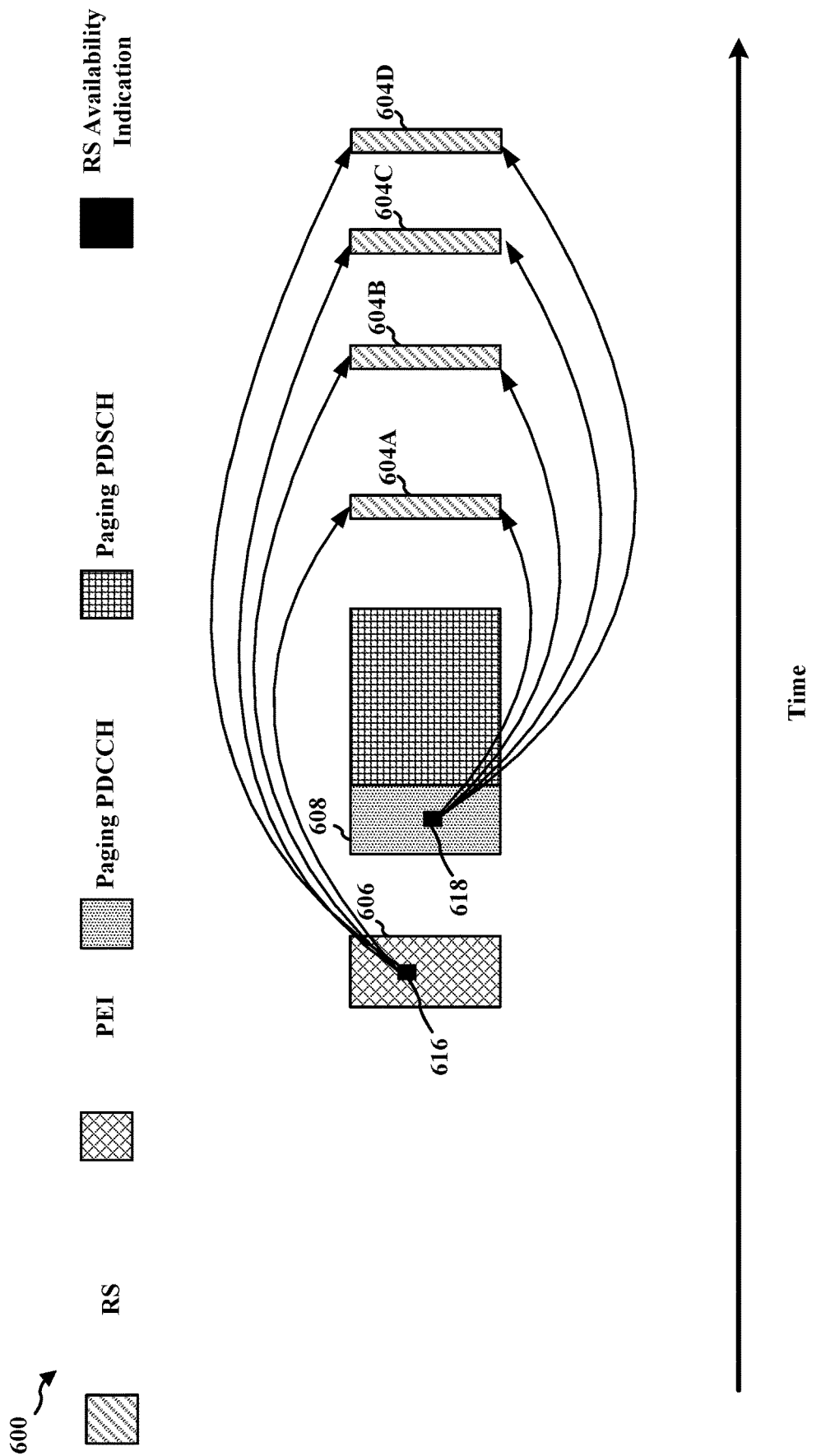
FIG. 6 is a diagram illustrating example RS availability indications in PEI and PDCCH.

FIG. 6 is a diagram 600 illustrating example RS availability indications in PEI and PDCCH. In some aspects, PEI and paging PDCCH may provide a same availability indication for a same set of RS resources with a same granularity. As illustrated in FIG. 6, the PEI 606 may carry a RS availability indication 616 indicating availabilities of RS 604A, RS 604B, RS 604C, and RS 604D based on a granularity of per RS. The paging PDCCH 608 may also carry a RS availability indication 618 indicating RS availabilities of RS 604A, RS 604B, RS 604C, and RS 604D based on a granularity of per RS. Even though the RS availability indication 618 and the RS availability indication 616 indicate availability of same RSs with a same granularity, the RS availability indication 618 and the RS availability indication 616 may carry the same information or different information. For example, a network (e.g., the base station 504) may change the transmission of a RS resource in a timeframe between the transmission of the PEI 606 and the paging PDCCH 608. For example, the base station 504 may change the RS 604B from available to unavailable; accordingly, the availability indication 616 may indicate that RS 604B would be available and the availability indication 618 may indicate that RS 604B would not be available. If there is no change, the UE 502 may obtain the same information about availability of configured RS resources from both the PEI 606 and the paging PDCCH 608. In some aspects, the PEI 606 may be a PDCCH based PEI (e.g., that may carry more information bits than a sequence based PEI). In some aspects, the PEI 606 may not be a sequence based PEI.

As another example, if reserved bits (which may include 6 or 8 bits) of the paging PDCCH 608 are used to carry the availability indication information, the PEI 606 may also have the same amount of information bits for availability indication. For example, if RS resources 0,1,2,3 corresponding to RS 604A, RS 604B, RS 604C, and RS 604D are configured, both PEI and paging PDCCH may have a 4-bit bitmap with per resource indication granularity and value "1100" indicating that RS resources 0 and 1 are transmitted but RS resources 2 and 3 are not transmitted.

As another example, RS resources 0,1,2,3 may be configured and RS resources 0,1 may be configured by network in RS resource set 0 and RS resources 2,3 are configured in RS resource set 1, bitmap 10 with per resource set granularity may indicate that the two RS resources in resource set 0 are transmitted but the two RS resources in resource set 1 are not transmitted.

In some aspects, the PEI 506 and the paging PDCCH 508 may provide different availability indication. For example, the PEI 506 and the paging PDCCH 508 may provide availability indication for different RS, or for same RS with different granularity of indication, or provide availability indication for different RS with different granularity of indication.

Figure 7:
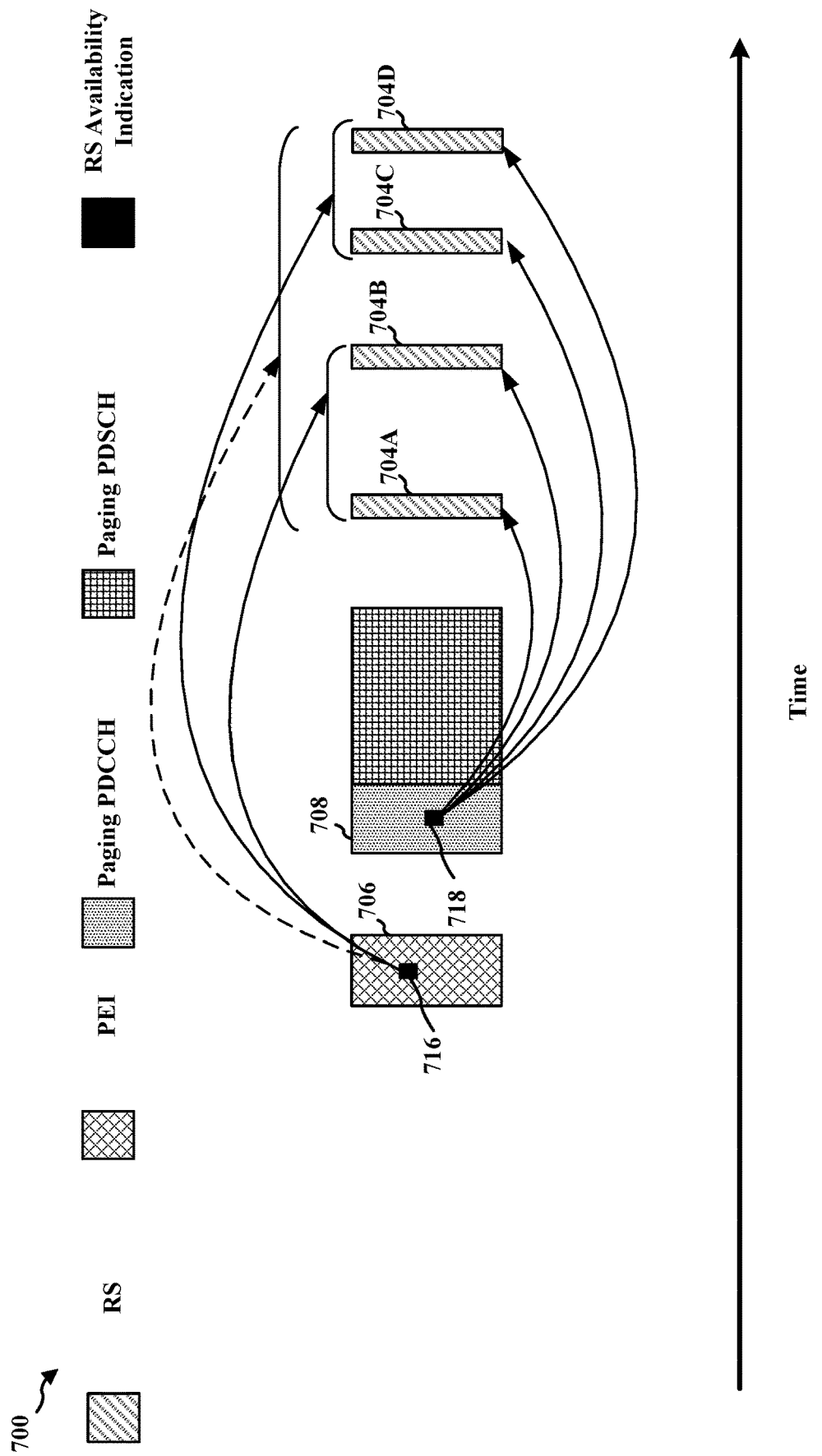
FIG. 7 is a diagram illustrating example RS availability indications in PEI and PDCCH.

In some aspects, the PEI 506 and the paging PDCCH 508 may jointly provide availability indication for configured RS resources. FIG. 7 is a diagram 700 illustrating example RS availability indications in PEI and PDCCH. As illustrated in FIG. 7, the PEI 706 may carry a RS availability indication 716 indicating availabilities of a first set of RS including RS 704A and RS 704B and a second set of RS including RS 704C and RS 704D based on a granularity of per RS set. The paging PDCCH 708 may also carry a RS availability indication 718 indicating availabilities of RS 704A, RS 704B, RS 704C, and RS 704D based on a granularity of per RS. By way of example, the availability indication 716 may include a bitmap with value 11 representing that one or more RS in the first set of RSs including RS 704A and 704B is available and one or more RS in the second set of RSs including RS 704C and 704D is available. The availability indication 718 may include a bitmap with value "1010" representing RS 704A and RS 704C are available and RS 704B and 704D are not available. In another example, the availability indication 716 may indicate whether any RS among RS 704A, RS 704B, RS 704C, or RS 704D may be available.

Figure 8:
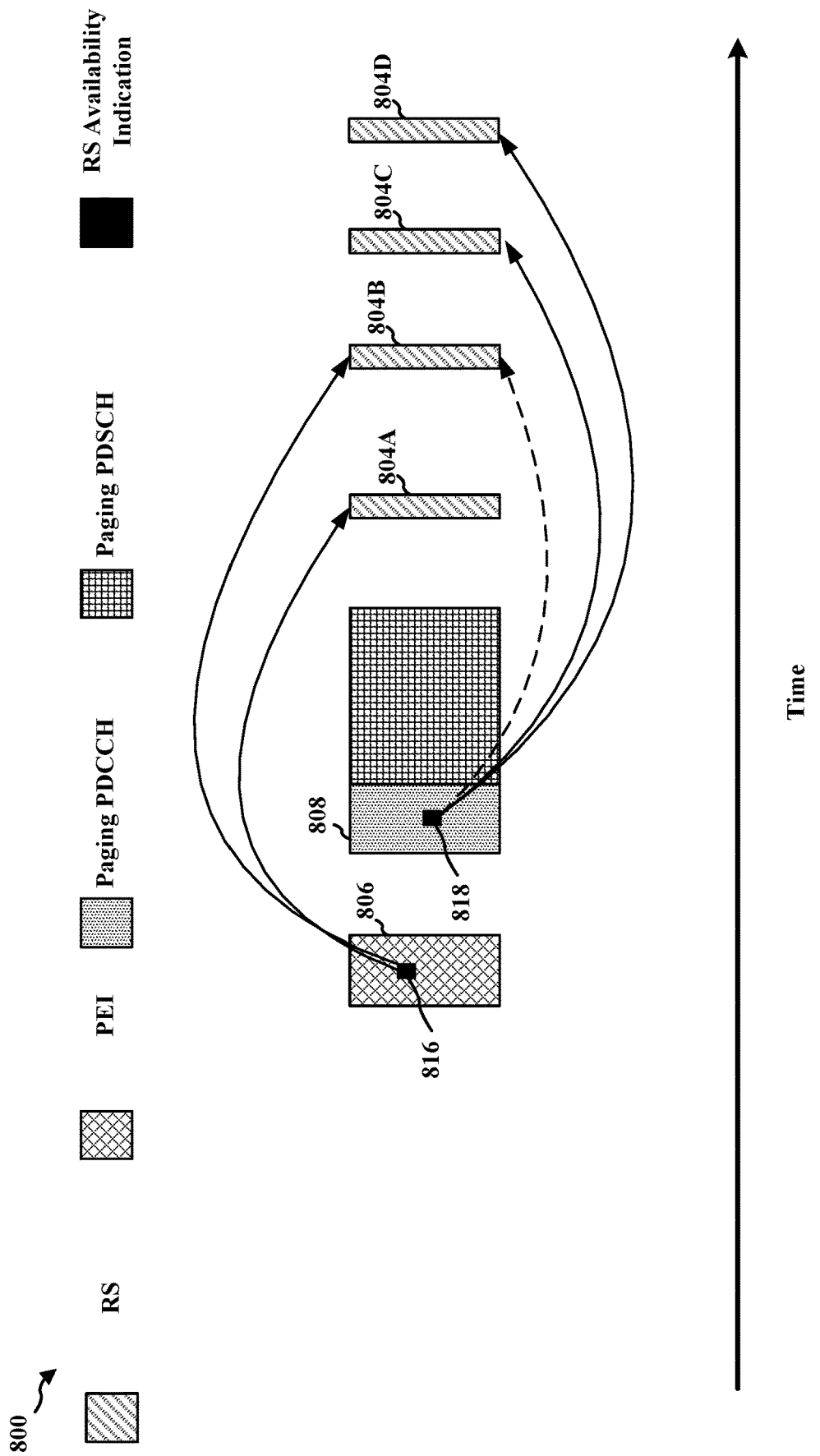
FIG. 8 is a diagram illustrating example RS availability indications in PEI and PDCCH.

In some aspects, the PEI 506 and the paging PDCCH 508 may independently provide availability indication for configured RS resources. FIG. 8 is a diagram 800 illustrating example RS availability indications in PEI and PDCCH. As illustrated in FIG. 8, the PEI 806 may carry a RS availability indication 816 indicating an availabilities of RS 804A and RS 804B. The paging PDCCH 808 may carry a RS availability indication 818 indicating availabilities of RS 804C, and RS 804D. For example, in some aspects, the RS availability indication 816 may include a 2-bit bitmap indicating whether RS 804A and RS 804B would be available and the RS availability indication 818 may include another 2-bit bitmap indicating whether RS 804C and RS 804D would be available. In some aspects, the RS availability indicated by the RS availability indication 816 and the RS availability indication 818 may be partially common. For example, the RS availability indication 818 may additionally indicate whether RS 804B would be available.

Figure 9:
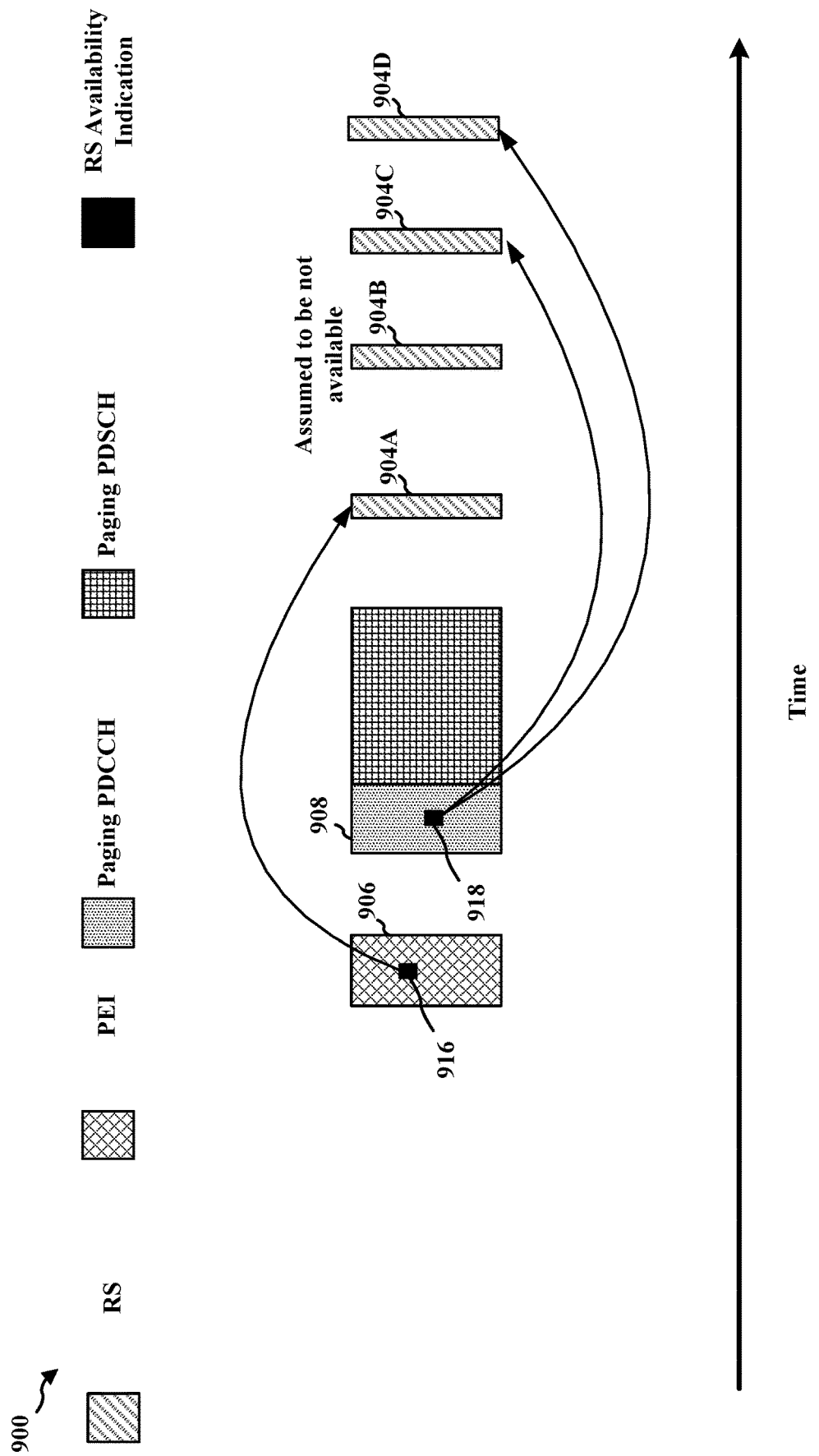
FIG. 9 is a diagram illustrating example RS availability indications in PEI and PDCCH.

In some aspects, if availability is provided for a subset of all configured RS resources, a UE may assume that other RSs outside the subset may not be available. FIG. 9 is a diagram 900 illustrating example RS availability indications in PEI and PDCCH. As illustrated in FIG. 9, the PEI 906 may carry a RS availability indication 916 indicating an availabilities of RS 904A. The paging PDCCH 908 may carry a RS availability indication 918 indicating availabilities of RS 904C, and RS 904D. The UE 502 may assume that the RS 904B may not be available because no availability information is provided.

Figure 10:
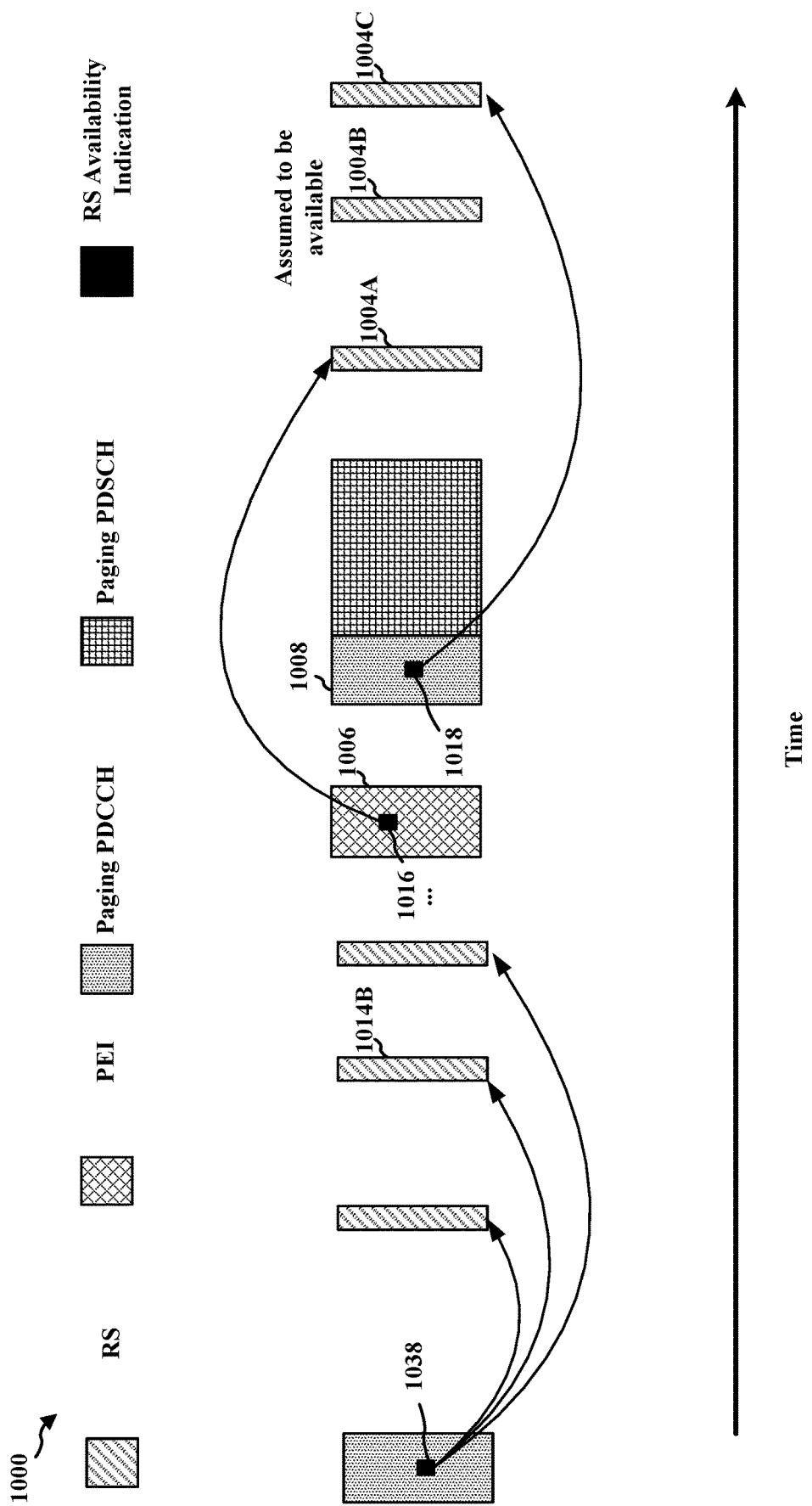
FIG. 10 is a diagram illustrating example RS availability indications in PEI and PDCCH.

In some aspects, if availability is provided for a subset of all configured RS resources, a UE may determine whether a RS outside the subset is available based on a previous availability indication, such as a lastly received availability indication. If this is the first time that the UE receives an availability indication of configured RS occasions, the UE may assume that the RS resource is not available (e.g., would not be transmitted). FIG. 10 is a diagram 1000 illustrating example RS availability indications in PEI and PDCCH. As illustrated in FIG. 10, the PEI 1006 may carry a RS availability indication 1016 indicating an availability of RS 1004A. The paging PDCCH 1008 may carry a RS availability indication 1018 indicating availability of RS 1004C. Based on a previously received availability indication 1038, the UE may determine that the second RS, RS 1004B, may be available because a corresponding RS 1014B is available in a previous PO.

Figure 11:
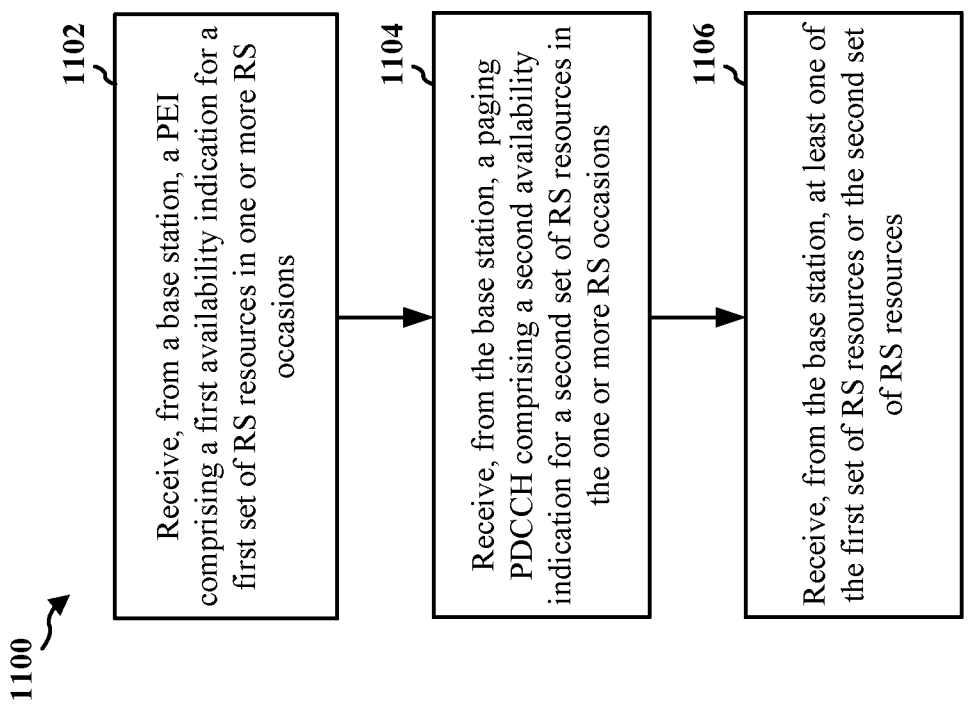
FIG. 11 is a flowchart of a method of wireless communication.

FIG. 11 is a flowchart 1100 of a method of wireless communication. The method may be performed by a UE (e.g., the UE 104, the UE 502; the apparatus 1302). The method may be used for improving operating efficiency of a UE capable of entering idle mode.

At 1102, the UE may receive, from a base station, a PEI including a first availability indication for a first set of RS resources in one or more RS occasions. For example, the UE 502 may receive, from a base station 504, a PEI 506 including a first availability indication for a first set of RS resources in one or more RS occasions. In some aspects, 1102 may be performed by PEI component 1442 in FIG. 14.

At 1104, the UE may receive, from the base station, a paging PDCCH including a second availability indication for a second set of RS resources in the one or more RS occasions. For example, the UE 502 may receive, from the base station 504, a paging PDCCH 508 including a second availability indication for a second set of RS resources in the one or more RS occasions. In some aspects, 1104 may be performed by PDCCH component 1444 in FIG. 14.

At 1106, the UE may receive, from the base station, at least one of the first set of RS resources or the second set of RS resources. For example, the UE 502 may receive, from the base station 504, at least one of the first set of RS resources or the second set of RS resources in the RS 510. In some aspects, 1106 may be performed by RS component 1446 in FIG. 14.

Figure 12:
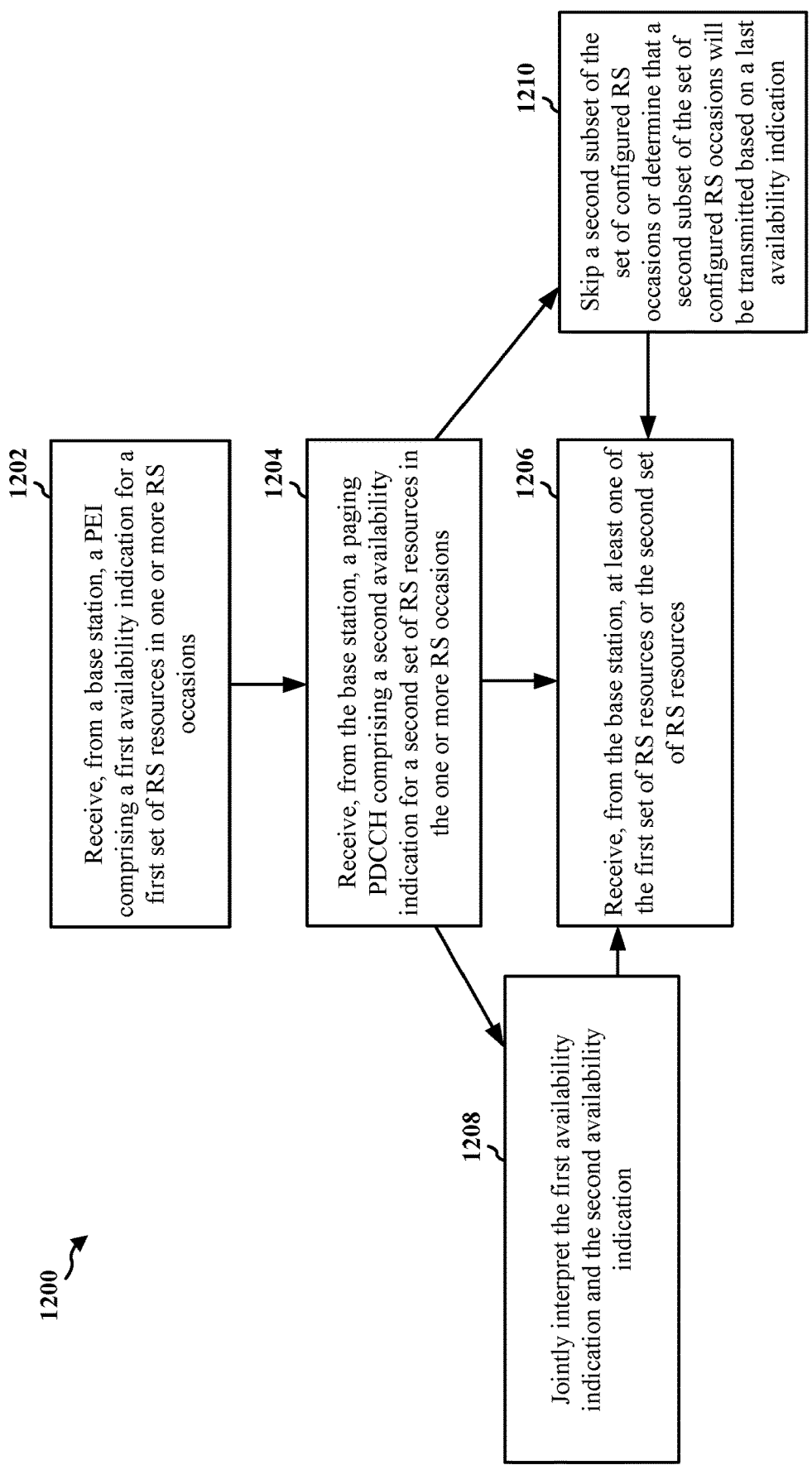
FIG. 12 is a flowchart of a method of wireless communication.

FIG. 12 is a flowchart 1200 of a method of wireless communication. The method may be performed by a UE (e.g., the UE 104, the UE 502; the apparatus 1302). The method may be used for improving operating efficiency of a UE capable of entering idle mode.

At 1202, the UE may receive, from a base station, a PEI including a first availability indication for a first set of RS resources in one or more RS occasions. For example, the UE 502 may receive, from a base station 504, a PEI 506 including a first availability indication for a first set of RS resources in one or more RS occasions. In some aspects, 1202 may be performed by PEI component 1442 in FIG. 14. In some aspects, the RS may include one or more of a CSI-RS or a TRS. In some aspects, the first availability indication is based on one of: 1) a bitmap including one or more bits, each bit representing availability for a resource unit, or 2) a codepoint indicating availability for a resource unit. In some aspects, the one or more RS occasions are configured via a SIB.

At 1204, the UE may receive, from the base station, a paging PDCCH including a second availability indication for a second set of RS resources in the one or more RS occasions. For example, the UE 502 may receive, from the base station 504, a paging PDCCH 508 including a second availability indication for a second set of RS resources in the one or more RS occasions. In some aspects, 1204 may be performed by PDCCH component 1444 in FIG. 14. In some aspects, the second availability indication is based on one of: 1) a bitmap including one or more bits, each bit representing availability for a resource unit, or 2) a codepoint indicating availability for a resource unit.

In some aspects, the first set of RS resources is identical to the second set of RS resources. For example, as illustrated in FIG. 6, the first set of RS resources indicated by the RS availability indication 616 is identical to the second set of RS resources indicated by the RS availability indication 618. In some aspects, the first availability indication is associated with a first granularity and the second availability indication is associated with a second granularity, the first granularity being equal to the second granularity. For example, as illustrated in FIG. 6, the RS availability indication 616 indicates RSs based on a granularity of per RS and the RS availability indication 618 also indicates RSs based on a granularity of per RS.

In some aspects, the first availability indication includes different information than the second availability indication. For example, the RS availability indication 616 may indicate that RS 604B would be available while the RS availability indication 618 may indicate that RS 604B would not be available due to a change of circumstances.

In some aspects, the first availability indication is associated with a first granularity and the second availability indication is associated with a second granularity, the first granularity being different from the second granularity. For example, as illustrated in FIG. 7, the RS availability indication 716 may indicate RS based on a granularity of a group of RS and the RS availability indication 718 may indicate RSs based on a granularity of per RS. In some aspects, the first set of RS resources is different from the second set of RS resources. For example, as illustrated in FIG. 8, the first set of RS resources may include RS 804A and RS 804B and the second set of RS resources may include RS 804B, RS 804C and RS 804D.

In some aspects, at 1208, the UE may jointly interpret the first availability indication and the second availability indication. In some aspects, 1208 may be performed by RS component 1446 in FIG. 14. For example, as illustrated in FIG. 7, the availability indication 718 may indicate that one or more RS in the group of RSs 704A, 704B one or more RS in the group of RSs 704C and 704D are available and the availability indication 716 may indicate which RS in the groups may be available.

In some aspects, the first availability indication is independent from the second availability indication. For example, as illustrated in FIG. 8, the RS availability indication 816 and the RS availability indication 818 may be independent.

In some aspects, the one or more RS occasions is associated with a first subset of a set of configured RS occasions, and the UE may, at 1210, skip a second subset of the set of configured RS occasions. For example, as illustrated in FIG. 9, the UE may assume that a second subset (e.g., RS 904B) of the set of configured RS occasions is not available. In some aspects, the one or more RS occasions is associated with a first subset of a set of configured RS occasions, and the UE may, at 1210, determine that a second subset of the set of configured RS occasions will be transmitted based on a last availability indication. For example, as illustrated in FIG. 10, the UE may determine that a second subset (e.g., RS 1004) of the set of configured RS occasions will be transmitted based on a last availability indication (e.g., availability indication 1038). In some aspects, at 1210, if the last availability indication is not present, the UE may skip reception of the second subset of the set of configured RS occasions.

At 1206, the UE may receive, from the base station, at least one of the first set of RS resources or the second set of RS resources. For example, the UE 502 may receive, from the base station 504, at least one of the first set of RS resources or the second set of RS resources in the RS 510. In some aspects, 1206 may be performed by RS component 1446 in FIG. 14.

Figure 13:
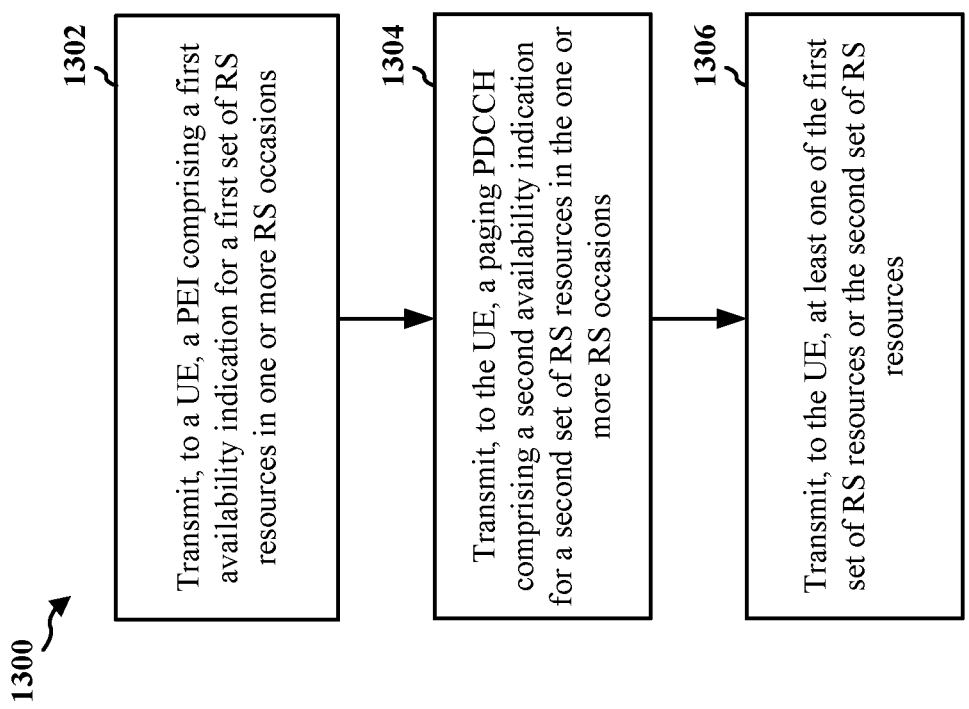
FIG. 13 is a flowchart of a method of wireless communication.

FIG. 13 is a flowchart 1300 of a method of wireless communication. The method may be performed by a base station (e.g., the base station 102/180, the base station 504; the apparatus 1402). The method may be used for improving operating efficiency of a UE capable of entering idle mode.

At 1302, the base station may transmit, to a UE, a PEI including a first availability indication for a first set of RS resources in one or more RS occasions. For example, the base station 504 may transmit, to a UE 502, a PEI 506 including a first availability indication for a first set of RS resources in one or more RS occasions. In some aspects, 1202 may be performed by PEI component 1542 in FIG. 15. In some aspects, the RS may include one or more of a CSI-RS or a TRS. In some aspects, the first availability indication is based on one of: 1) a bitmap including one or more bits, each bit representing availability for a resource unit, or 2) a codepoint indicating availability for a resource unit. In some aspects, the one or more RS occasions are configured via a SIB.

At 1304, the base station may transmit, to the UE, a paging PDCCH including a second availability indication for a second set of RS resources in the one or more RS occasions. For example, the base station 504 may transmit, to the UE 502, a paging PDCCH 508 including a second availability indication for a second set of RS resources in the one or more RS occasions. In some aspects, 1304 may be performed by PDCCH component 1544 in FIG. 15. In some aspects, the second availability indication is based on one of: 1) a bitmap including one or more bits, each bit representing availability for a resource unit, or 2) a codepoint indicating availability for a resource unit.

In some aspects, the first set of RS resources is identical to the second set of RS resources. For example, as illustrated in FIG. 6, the first set of RS resources indicated by the RS availability indication 616 is identical to the second set of RS resources indicated by the RS availability indication 618. In some aspects, the first availability indication is associated with a first granularity and the second availability indication is associated with a second granularity, the first granularity being equal to the second granularity. For example, as illustrated in FIG. 6, the RS availability indication 616 indicates RSs based on a granularity of per RS and the RS availability indication 618 also indicates RSs based on a granularity of per RS.

In some aspects, the first availability indication includes different information than the second availability indication. For example, the RS availability indication 616 may indicate that RS 604B would be available while the RS availability indication 618 may indicate that RS 604B would not be available due to a change of circumstances. In some aspects, the first availability indication is associated with a first granularity and the second availability indication is associated with a second granularity, the first granularity being different from the second granularity. For example, as illustrated in FIG. 7, the RS availability indication 716 may indicate RS based on a granularity of a group of RS and the RS availability indication 718 may indicate RSs based on a granularity of per RS. In some aspects, the first set of RS resources is different from the second set of RS resources. For example, as illustrated in FIG. 8, the first set of RS resources may include RS 804A and RS 804B and the second set of RS resources may include RS 804B, RS 804C and RS 804D.

At 1306, the base station may transmit, to the UE, at least one of the first set of RS resources or the second set of RS resources. For example, the base station 504 may transmit, to the UE 502, at least one of the first set of RS resources or the second set of RS resources in the RS 510. In some aspects, 1306 may be performed by RS component 1546 in FIG. 15.

Figure 14:
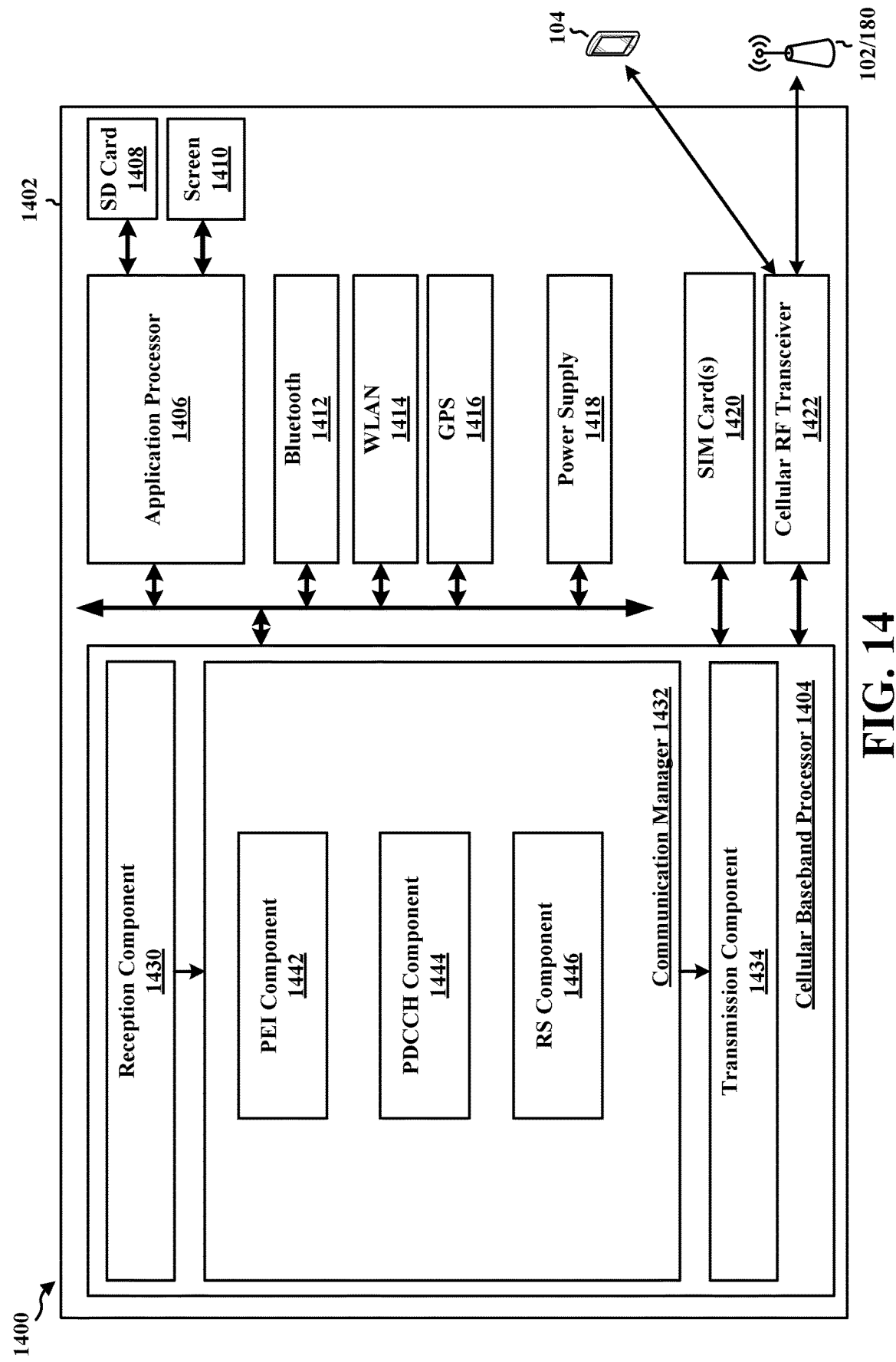
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the cellular baseband processor 1404, and in another configuration, the apparatus 1402 may be the entire UE (e.g., see 350 of FIG. 3) and include the additional modules of the apparatus 1402.

The communication manager 1432 may include a PEI component 1442 that is configured to receive, from a base station, a PEI including a first availability indication for a first set of RS resources in one or more RS occasions, e.g., as described in connection with 1102 in FIGS. 11 and 1202 in FIG. 12. The communication manager 1432 may further include a component 1444 that may be configured to receive, from the base station, a paging PDCCH including a second availability indication for a second set of RS resources in the one or more RS occasions, e.g., as described in connection with 1104 in FIGS. 11 and 1204 in FIG. 12. The communication manager 1432 may further include a component 1446 that may be configured to receive, from the base station, at least one of the first set of RS resources or the second set of RS resources, e.g., as described in connection with 1106 in FIGS. 11 and 1206-1210 in FIG. 12.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for receiving, from a base station, a PEI including a first availability indication for a first set of RS resources in one or more RS occasions. The cellular baseband processor 1404 may further include means for receiving, from the base station, a paging PDCCH including a second availability indication for a second set of RS resources in the one or more RS occasions. The cellular baseband processor 1404 may further include means for receiving, from the base station, at least one of the first set of RS resources or the second set of RS resources. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
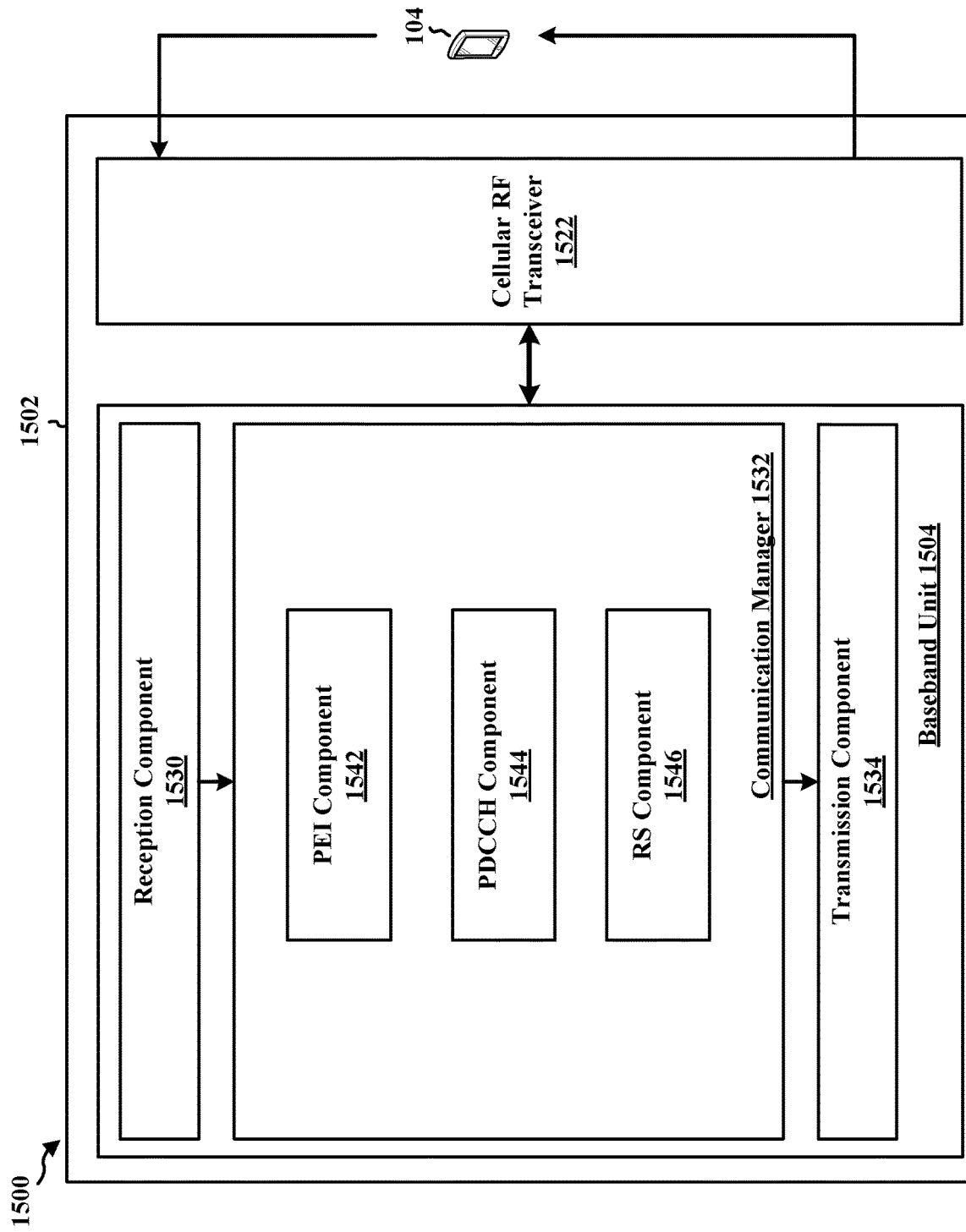
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1302 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 may include a PEI component 1542 that may transmit, to a UE, a PEI including a first availability indication for a first set of RS resources in one or more RS occasions, e.g., as described in connection with 1302 in FIG. 13. The communication manager 1532 further may include a PDCCH component 1544 that may transmit, to the UE, a paging PDCCH including a second availability indication for a second set of RS resources in the one or more RS occasions, e.g., as described in connection with 1304 in FIG. 13. The communication manager 1532 further may include a RS component 1546 that may transmit, to the UE, at least one of the first set of RS resources or the second set of RS resources, e.g., as described in connection with 1306 in FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, may include means for transmitting, to a UE, a PEI including a first availability indication for a first set of RS resources in one or more RS occasions. The baseband unit 1504 may further include means for transmitting, to the UE, a paging PDCCH including a second availability indication for a second set of RS resources in the one or more RS occasions. The baseband unit 1504 may further include means for transmitting, to the UE, at least one of the first set of RS resources or the second set of RS resources. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from a base station, a PEI comprising a first availability indication for a first set of RS resources in one or more RS occasions; receive, from the base station, a paging PDCCH comprising a second availability indication for a second set of RS resources in the one or more RS occasions; and receive, from the base station, at least one of the first set of RS resources or the second set of RS resources.

Aspect 2 is the apparatus of aspect 1, wherein the first set of RS resources is identical to the second set of RS resources, and wherein the first availability indication is associated with a first granularity and the second availability indication is associated with a second granularity, the first granularity being equal to the second granularity.

Aspect 3 is the apparatus of any of aspects 1-2, wherein the first availability indication comprises different information than the second availability indication.

Aspect 4 is the apparatus of any of aspects 1-3, wherein the first availability indication is associated with a first granularity and the second availability indication is associated with a second granularity, the first granularity being different from the second granularity.

Aspect 5 is the apparatus of any of aspects 1-4, wherein the memory and the at least one processor are configured to jointly interpret the first availability indication and the second availability indication.

Aspect 6 is the apparatus of any of aspects 1-5, wherein the first set of RS resources is different from the second set of RS resources.

Aspect 7 is the apparatus of any of aspects 1-4 or 6, wherein the first availability indication is independent from the second availability indication.

Aspect 8 is the apparatus of any of aspects 1-7, wherein the one or more RS occasions is associated with a first subset of a set of configured RS occasions, and wherein the memory and the at least one processor are configured to skip a second subset of the set of configured RS occasions.

Aspect 9 is the apparatus of any of aspects 1-8, wherein the one or more RS occasions is associated with a first subset of a set of configured RS occasions, and wherein the memory and the at least one processor are configured to determine that a second subset of the set of configured RS occasions will be transmitted based on a last availability indication.

Aspect 10 is the apparatus of any of aspects 1-8, wherein the memory and the at least one processor are configured to skip reception of the second subset of the set of configured RS occasions if the last availability indication is not present.

Aspect 11 is the apparatus of any of aspects 1-10, wherein the first set of RS resources and the second set of RS resources are for a CSI-RS or a TRS.

Aspect 12 is the apparatus of any of aspects 1-11, wherein the one or more RS occasions are configured via a SIB.

Aspect 13 is the apparatus of any of aspects 1-12, wherein the first availability indication is based on one of: a bitmap comprising one or more bits, each bit representing an availability for a resource unit, or a codepoint indicating the availability for the resource unit.

Aspect 14 is the apparatus of any of aspects 1-13, wherein the second availability indication is based on one of: a bitmap comprising one or more bits, each bit representing availability for a resource unit, or a codepoint indicating the availability for the resource unit.

Aspect 15 is the apparatus of any of aspects 1-14, further comprising a transceiver coupled to the at least one processor.

Aspect 16 is an apparatus for wireless communication at a base station, comprising: a memory; and at least one processor coupled to the memory and configured to: transmit, to a UE, a PEI comprising a first availability indication for a first set of RS resources in one or more RS occasions; transmit, to the UE, a paging PDCCH comprising a second availability indication for a second set of RS resources in the one or more RS occasions; and transmit, to the UE, at least one of the first set of RS resources or the second set of RS resources.

Aspect 17 is the apparatus of aspect 16, wherein the first set of RS resources is identical to the second set of RS resources, and wherein the first availability indication is associated with a first granularity and the second availability indication is associated with a second granularity, the first granularity being equal to the second granularity.

Aspect 18 is the apparatus of any of aspects 16-17, wherein the first availability indication comprises different information than the second availability indication.

Aspect 19 is the apparatus of any of aspects 16-18, wherein the first availability indication is associated with a first granularity and the second availability indication is associated with a second granularity, the first granularity being different from the second granularity.

Aspect 20 is the apparatus of any of aspects 16-19, wherein the first availability indication and the second availability indication are configured to jointly indicate reference signal availability.

Aspect 21 is the apparatus of any of aspects 16-20, wherein the first set of RS resources is different from the second set of RS resources.

Aspect 22 is the apparatus of any of aspects 16-19 or 21, wherein the first availability indication is independent from the second availability indication.

Aspect 23 is the apparatus of any of aspects 16-22, wherein the first set of RS resources and the second set of RS resources are for a CSI-RS or a TRS.

Aspect 24 is the apparatus of any of aspects 16-23, wherein the one or more RS occasions are configured via SIB.

Aspect 25 is the apparatus of any of aspects 16-24, wherein the first availability indication is based on one of: a bitmap comprising one or more bits, each bit representing availability for a resource unit, or a codepoint indicating the availability for the resource unit.

Aspect 26 is the apparatus of any of aspects 16-25, wherein the second availability indication is based on one of: a bitmap comprising one or more bits, each bit representing an availability for a resource unit, or a codepoint indicating the availability for the resource unit.

Aspect 27 is the apparatus of any of aspects 16-26, further comprising a transceiver coupled to the at least one processor.

What is claimed is:

1. An apparatus for wireless communication at a user equipment (UE), comprising:
    a memory; and
    at least one processor coupled to the memory and configured to:
        receive, from a base station, a paging early indication (PEI) comprising a first availability indication for a first set of reference signal (RS) resources in one or more RS occasions;
        receive, from the base station, a paging physical downlink control channel (PDCCH) comprising a second availability indication for a second set of RS resources in the one or more RS occasions; and
        receive, from the base station, at least one of the first set of RS resources or the second set of RS resources,
        wherein the first availability indication being based on a first bitmap comprising a first amount of bits, each bit representing an availability for a resource unit of a first granularity,
        the second availability indication being based on a second bitmap comprising a second amount of bits, each bit representing an availability for a resource unit of a second granularity,
        the first granularity being equal to the second granularity, and
        the first amount being equal to the second amount.

2. The apparatus of claim 1, wherein the first set of RS resources is identical to the second set of RS resources.

3. The apparatus of claim 2, wherein the first availability indication comprises different information than the second availability indication.

4. The apparatus of claim 1, wherein the memory and the at least one processor are configured to:
    in a case where a subset of configured RS resource units is indicated as available by a current availability indication, determine whether a RS resource unit outside the subset is available based on a previous availability indication.

5. The apparatus of claim 1, wherein the first set of RS resources is different from the second set of RS resources.

6. The apparatus of claim 1, wherein the first availability indication is independent from the second availability indication.

7. The apparatus of claim 1, wherein the one or more RS occasions is associated with a first subset of a set of configured RS occasions, and wherein the memory and the at least one processor are configured to skip a second subset of the set of configured RS occasions.

8. The apparatus of claim 1, wherein the one or more RS occasions is associated with a first subset of a set of configured RS occasions, and wherein the memory and the at least one processor are configured to determine that a second subset of the set of configured RS occasions will be transmitted based on a last availability indication.

9. The apparatus of claim 8, wherein the memory and the at least one processor are configured to skip reception of the second subset of the set of configured RS occasions if the last availability indication is not present.

10. The apparatus of claim 1, wherein the first set of RS resources and the second set of RS resources are for a channel state information (CSI)-RS or a tracking RS (TRS).

11. The apparatus of claim 1, wherein the one or more RS occasions are configured via a system information block (SIB).

12. The apparatus of claim 1, wherein each of the first granularity and the second granularity is per RS resource set granularity.

13. The apparatus of claim 1, further comprising a transceiver coupled to the at least one processor.

14. An apparatus for wireless communication at a base station, comprising:
    a memory; and
    at least one processor coupled to the memory and configured to:
        transmit, to a user equipment (UE), a paging early indication (PEI) comprising a first availability indication for a first set of reference signal (RS) resources in one or more RS occasions;
        transmit, to the UE, a paging physical downlink control channel (PDCCH) comprising a second availability indication for a second set of RS resources in the one or more RS occasions; and
        transmit, to the UE, at least one of the first set of RS resources or the second set of RS resources,
        wherein the first availability indication being based on a first bitmap comprising a first amount of bits, each bit representing an availability for a resource unit of a first granularity,
        the second availability indication being based on a second bitmap comprising a second amount of bits, each bit representing an availability for a resource unit of a second granularity,
        the first granularity being equal to the second granularity, and
        the first amount being equal to the second amount.

15. The apparatus of claim 14, wherein the first set of RS resources is identical to the second set of RS resources.

16. The apparatus of claim 15, wherein the first availability indication comprises different information than the second availability indication.

17. The apparatus of claim 14, wherein the first set of RS resources is different from the second set of RS resources.

18. The apparatus of claim 14, wherein the first availability indication is independent from the second availability indication.

19. The apparatus of claim 14, wherein the first set of RS resources and the second set of RS resources are for a channel state information (CSI)-RS or a tracking RS (TRS).

20. The apparatus of claim 14, wherein the one or more RS occasions are configured via system information block (SIB).

21. The apparatus of claim 14, wherein each of the first granularity and the second granularity is per RS resource set granularity.

22. The apparatus of claim 14, further comprising a transceiver coupled to the at least one processor.

23. A method for wireless communication at a user equipment (UE), comprising:
  receiving, from a base station, a paging early indication (PEI) comprising a first availability indication for a first set of reference signal (RS) resources in one or more RS occasions;
  receiving, from the base station, a paging physical downlink control channel (PDCCH) comprising a second availability indication for a second set of RS resources in the one or more RS occasions; and
  receiving, from the base station, at least one of the first set of RS resources or the second set of RS resources,
  wherein the first availability indication being based on a first bitmap comprising a first amount of bits, each bit representing an availability for a resource unit of a first granularity,
  the second availability indication being based on a second bitmap comprising a second amount of bits, each bit representing an availability for a resource unit of a second granularity,
  the first granularity being equal to the second granularity, and
  the first amount being equal to the second amount.

24. The method of claim 23, wherein the first set of RS resources is identical to the second set of RS resources.

25. The method of claim 23, further comprising:
  in a case where a subset of configured RS resource units is indicated as available by a current availability indication, determining whether a RS resource unit outside the subset is available based on a previous availability indication.

26. The method of claim 23, wherein the first availability indication is independent from the second availability indication.

27. The method of claim 23, wherein each of the first granularity and the second granularity is per RS resource set granularity.

28. A method for wireless communication at a base station, comprising:
  transmitting, to a user equipment (UE), a paging early indication (PEI) comprising a first availability indication for a first set of reference signal (RS) resources in one or more RS occasions;
  transmitting, to the UE, a paging physical downlink control channel (PDCCH) comprising a second availability indication for a second set of RS resources in the one or more RS occasions; and
  transmitting, to the UE, at least one of the first set of RS resources or the second set of RS resources,
  wherein the first availability indication being based on a first bitmap comprising a first amount of bits, each bit representing an availability for a resource unit of a first granularity,
  the second availability indication being based on a second bitmap comprising a second amount of bits, each bit representing an availability for a resource unit of a second granularity,
  the first granularity being equal to the second granularity, and
  the first amount being equal to the second amount.

29. The method of claim 28, wherein the first set of RS resources is identical to the second set of RS resources.

30. The method of claim 28, wherein each of the first granularity and the second granularity is per RS resource set granularity.

31. A user equipment (UE), comprising:
  means for receiving, from a base station, a paging early indication (PEI) comprising a first availability indication for a first set of reference signal (RS) resources in one or more RS occasions;
  means for receiving, from the base station, a paging physical downlink control channel (PDCCH) comprising a second availability indication for a second set of RS resources in the one or more RS occasions; and
  means for receiving, from the base station, at least one of the first set of RS resources or the second set of RS resources,
  wherein the first availability indication being based on a first bitmap comprising a first amount of bits, each bit representing an availability for a resource unit of a first granularity,
  the second availability indication being based on a second bitmap comprising a second amount of bits, each bit representing an availability for a resource unit of a second granularity,
  the first granularity being equal to the second granularity, and
  the first amount being equal to the second amount.

32. A base station, comprising:
  means for transmitting, to a user equipment (UE), a paging early indication (PEI) comprising a first availability indication for a first set of reference signal (RS) resources in one or more RS occasions;
  means for transmitting, to the UE, a paging physical downlink control channel (PDCCH) comprising a second availability indication for a second set of RS resources in the one or more RS occasions; and
  means for transmitting, to the UE, at least one of the first set of RS resources or the second set of RS resources,
  wherein the first availability indication being based on a first bitmap comprising a first amount of bits, each bit representing an availability for a resource unit of a first granularity,
  the second availability indication being based on a second bitmap comprising a second amount of bits, each bit representing an availability for a resource unit of a second granularity,
  the first granularity being equal to the second granularity, and
  the first amount being equal to the second amount.

* * * * *